(12) United States Patent
Sato et al.

(10) Patent No.: US 9,729,731 B1
(45) Date of Patent: Aug. 8, 2017

(54) INFORMATION PROCESSING APPARATUS

(71) Applicant: FUJI XEROX CO., LTD., Tokyo (JP)

(72) Inventors: Hideki Sato, Yokohama (JP); Seishiro Kato, Yokohama (JP); Tomitsugu Koseki, Yokohama (JP); Harunobu Miyashita, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/207,087

(22) Filed: Jul. 11, 2016

(30) Foreign Application Priority Data

Mar. 15, 2016 (JP) ................................ 2016-050961

(51) Int. Cl.
| | | |
|---|---|---|
| G06F 12/00 | (2006.01) | |
| H04N 1/00 | (2006.01) | |
| H04N 1/23 | (2006.01) | |
| H04N 1/32 | (2006.01) | |

(52) U.S. Cl.
CPC ..... *H04N 1/00095* (2013.01); *H04N 1/00801* (2013.01); *H04N 1/2323* (2013.01); *H04N 1/32582* (2013.01); *H04N 2201/0094* (2013.01)

(58) Field of Classification Search
CPC ...... H04N 1/95; H04N 1/801; H04N 1/32582; H04N 1/2323; H04N 2201/94
USPC ......................................................... 358/1.15
See application file for complete search history.

(56) References Cited

U.S. PATENT DOCUMENTS

| | | | | |
|---|---|---|---|---|
| 2002/0097408 A1* | 7/2002 | Chang | ............... | G06F 3/1245 |
| | | | | 358/1.6 |
| 2010/0322259 A1* | 12/2010 | Garg | ............... | H04L 65/4015 |
| | | | | 370/401 |
| 2012/0081759 A1* | 4/2012 | Itoh | ............... | H04N 1/00588 |
| | | | | 358/449 |
| 2013/0242355 A1* | 9/2013 | Morita | ............... | H04N 1/00734 |
| | | | | 358/449 |
| 2014/0153051 A1* | 6/2014 | Ma | ............... | H04N 1/3872 |
| | | | | 358/1.18 |
| 2015/0160902 A1* | 6/2015 | Tsujita | ............... | G06F 3/1257 |
| | | | | 358/1.6 |
| 2015/0255076 A1* | 9/2015 | Fejzo | ............... | G10L 19/008 |
| | | | | 704/500 |
| 2016/0219175 A1* | 7/2016 | Uchida | ............... | H04N 1/00896 |
| 2016/0295344 A1* | 10/2016 | Danree | ............... | H04W 4/003 |

FOREIGN PATENT DOCUMENTS

JP 2011-142521 A 7/2011

* cited by examiner

*Primary Examiner* — Jerome Grant, II
(74) *Attorney, Agent, or Firm* — Oliff PLC

(57) ABSTRACT

Provided is an information processing apparatus that transmits image data input by sequentially reading originals, with limiting an allowable frame size. The apparatus includes: a transmission control unit, in which, in a case where an original has an existing size, the transmission control unit transmits the image data to a destination with frames having one of frame sizes selected based on the existing size of the original, such that transmission of the current image data is finished before a start of transmission of the image data of the next original.

2 Claims, 5 Drawing Sheets

INFORMATION PROCESSING APPARATUS

CROSS-REFERENCE TO RELATED APPLICATIONS

This application is based on and claims priority under 35 USC 119 from Japanese Patent Application No. 2016-050961 filed on Mar. 15, 2016.

BACKGROUND

Technical Field

The present invention relates to an information processing apparatus.

SUMMARY

An aspect of the invention provides an information processing apparatus that transmits image data input by sequentially reading originals, with limiting an allowable frame size, the apparatus including:

a transmission control unit, in which, in a case where an original has an existing size, the transmission control unit transmits the image data to a destination with frames having one of frame sizes selected based on the existing size of the original, such that transmission of the current image data is finished before a start of transmission of the image data of the next original.

BRIEF DESCRIPTION OF THE DRAWINGS

Exemplary embodiment(s) of the present invention will be described in detail based on the following figures, wherein.

DETAILED DESCRIPTION

Figure 1:
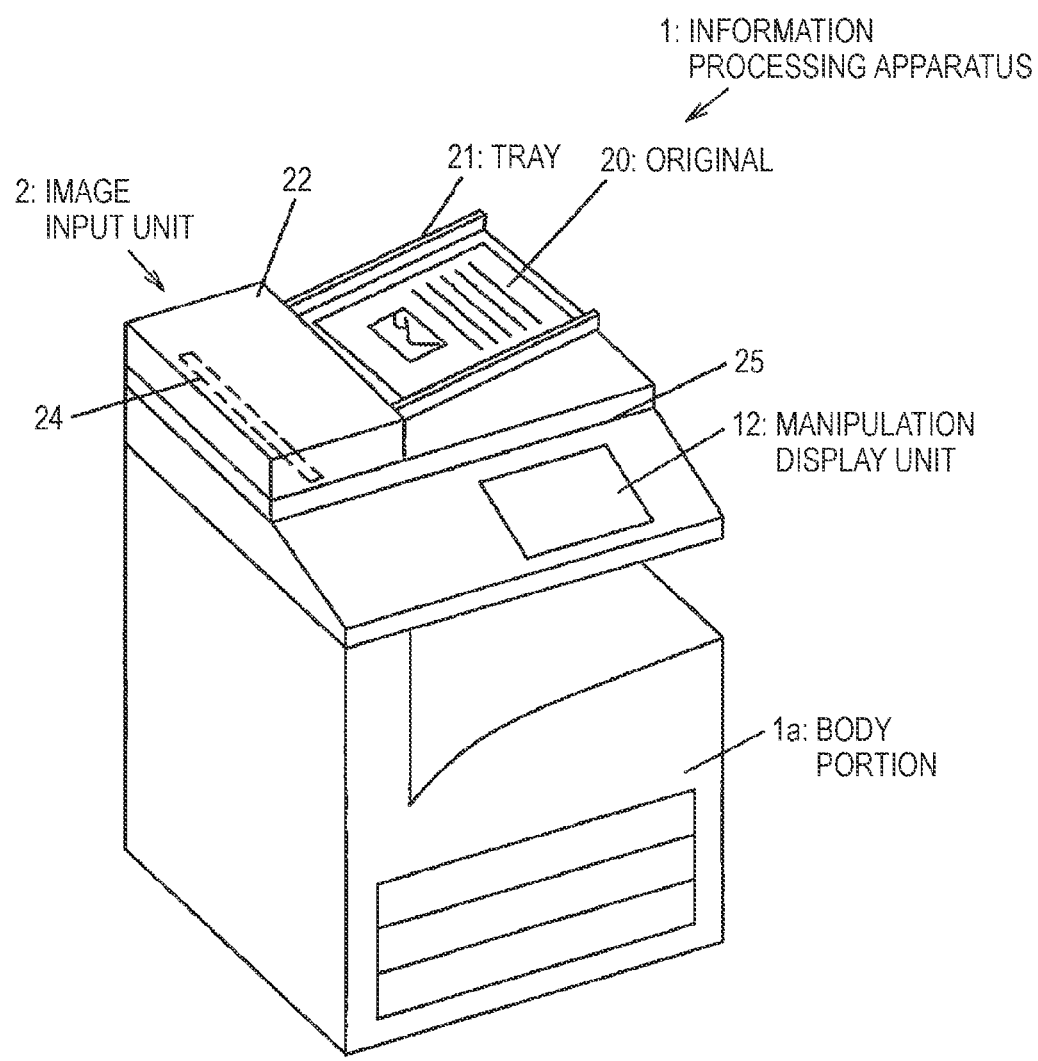
FIG. 1 is a perspective view illustrating an instance of appearance of an information processing apparatus according to an exemplary embodiment of the invention.

An exemplary embodiment of the invention will now be described with reference to the accompanying drawings. In each drawing, constituent elements having substantially the same function are given the same reference numerals and overlapping description will not be provided.

FIG. 1 is a perspective view illustrating an instance of appearance of an information processing apparatus according to an exemplary embodiment of the invention.

Figure 2:
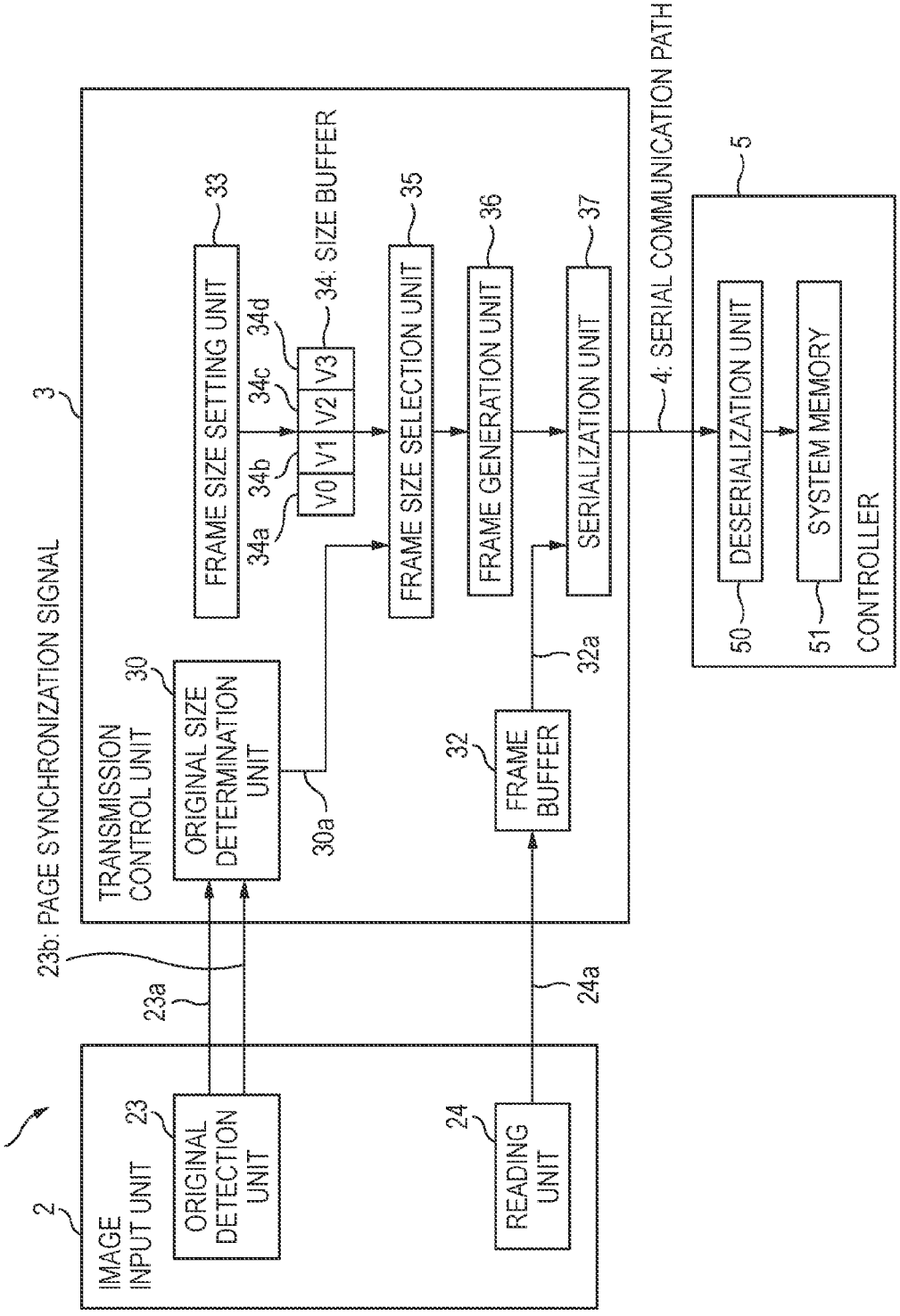
FIG. 2 is a block diagram illustrating an instance of a control system of an information processing apparatus according to an exemplary embodiment of the invention.

The information processing apparatus 1 includes an automatic sheet feeding device 22 configured to automatically feed plural originals 20 placed in a tray 21 in a stack state one by one to a reading unit 24 and an image input unit 2 provided with an original platen 25 where the originals 20 are placed one by one. In addition, the information processing apparatus 1 is a multifunction device having various functionalities such as a printer, a copier, and a facsimile. The information processing apparatus 1 further includes a controller 5 provided with a central processing unit (CPU), a nonvolatile memory, and the like to process information of a body portion 1a as illustrated in FIG. 2 and a transmission control unit 3 configured to control transmission of image data input from the image input unit 2 to a controller 5 through a serial communication path 4 as illustrated in FIG. 2. Moreover, the information processing apparatus 1 has a manipulation display unit 12 such as a touch display for displaying a menu, various buttons, and the like and receiving manipulations therefrom. Here, the controller 5 is an instance of transmission destinations.

The originals 20 as a target object of the apparatus 1 have an existing formal size. The "formal size" refers to a size of the original that conforms to the JIS standard such as an A-series (such as A3 or A4) or a B-series (such as B3 or B4), an American legal letter format, and the like.

FIG. 2 is a block diagram illustrating an instance of a control system of an information processing apparatus 1 according to an exemplary embodiment of the invention. The information processing apparatus 1 has an image input unit 2 configured to receive input image data, a transmission control unit 3 configured to transmit the image data input from the image input unit 2 to the controller 5 through the serial communication path 4, and a controller 5 configured to store the image data transmitted from the transmission control unit 3.

The image input unit 2 has an original detection unit 23 configured to detect the original 20 supplied from the automatic sheet feeding device 22 and a reading unit 24 configured to optically read the image data on the original 20 supplied from the automatic sheet feeding device 22 or the original 20 laid on the original platen 25 using a solid image capturing element such as a charge-coupled device (CCD).

In the serial communication path 4, a serial interface such as the Mobile Industry Processor Interface (MIPI) is employed, in which the number of allowable frame sizes is limited to several frame sizes ("4" in this exemplary embodiment, that is, $V_0$, $V_1$, $V_2$, and $V_3$ in the order from the larger size). In the MIPI, an arbitrary frame size is not allowed, and it is necessary to select one of the four frame sizes prepared in advance. For instance, the frame size may include 720×480p, 1280×720p, 1920×1080p, 4096×2160p, 3840×2160p, and the like. In the MIPI, plural virtual channels may share a single communication path, and each of the virtual channels is provided with a buffer. In this exemplary embodiment, this buffer is used as a size buffer 34 for storing the frame sizes.

The controller 5 has a deserialization unit 50 configured to convert serial image data transmitted from the transmission control unit 3 through the serial communication path 4 into parallel image data, and a nonvolatile system memory 51 configured to store the image data converted by the deserialization unit 50. The controller 5 transmits the image data stored in the system memory 51 to a printer engine, a hard disc, a user terminal, and the like depending on the selected menu.

The original detection unit 23 has plural original sensors arranged in plural portions in a main scanning direction to transmit an original detection signal 23a in the event of detection of the original 20, and an edge sensor configured to detect leading and trailing ends of the original 20 in a sub-scanning direction (feeding direction) and transmit a page synchronization signal 23b.

<Configuration of Transmission Control Unit>

When the original 20 has an existing size, the transmission control unit 3 segments the image data into one or more frames having the same frame size based on the existing size of the original 20 and transmits the segmented image data to the controller 5 through the serial communication path 4 such that transmission of the current image data is finished before a start of transmission of the image data corresponding to the next original 20.

The number of frame sizes employed in the information processing apparatus 1 is not limited to four. For instance, either three or two frame sizes may be employed.

The transmission control unit 3 includes an original size determination unit 30, a frame buffer 32, a frame size setting unit 33, a size buffer 34, a frame size selection unit 35, a frame generation unit 36, and a serialization unit 37. The transmission control unit 3 may be implemented, for instance, using an application specific integrated circuit (ASIC), a field programmable gate array (FPGA), and the like. Here, the frame buffer 32 is an instance of a storing unit.

The original size determination unit 30 determines a size of the original and whether the original 20 has a formal or informal size based on the original detection signal 23a from the original sensor of the original detection unit 23 and the page synchronization signal 23b from the edge sensor. That is, if the original size determination unit 30 determines that the original 20 has a formal size, the size of the original 20 in the main scanning direction is detected based on the original detection signal 23a, and the size of the original 20 in the sub-scanning direction is detected based on the page synchronization signal 23b. The original size determination unit 30 outputs a determination result 30a for the original 20 to the frame size selection unit 35.

The frame buffer 32 stores the image data of one page output from the reading unit 24 as bitmap data. As the storing operation of the image data is terminated, the frame buffer 32 transmits the bitmap data stored therein to the serialization unit 37.

The frame size setting unit 33 sets a frame size that can be used in the serial communication path 4 in the size buffer 34 based on a user's manipulation entering to the manipulation display unit 12.

The size buffer 34 has plural buffers 34a to 34d. The buffers 34a to 34d store frame sizes $V_0$, $V_1$, $V_2$, and $V_3$, respectively, set by the frame size setting unit 33.

If the original size determination unit 30 determines that the original 20 has a formal size, the frame size selection unit 35 selects one of the frame sizes $V_0$, $V_1$, $V_2$, and $V_3$ from the size buffer 34 such that the image data are segmented and transmitted in one or more frames based on the existing size of the original 20, and transmission of the current image data is finished before a start of transmission of the image data of the next original.

The frame size selection unit 35 selects the larger frame sizes $V_0$ to $V_2$ with a higher priority out of the frame sizes $V_0$ to $V_3$.

The frame size selection unit 35 selects one of the frame sizes $V_0$ to $V_3$ and the number of segments "N" (including "1" which means no segment) and then controls the frame generation unit 36 such that frames having a frame size corresponding to the number of segments N are generated.

The frame generation unit 36 generates the "N" frames each having the frame size selected by the frame size selection unit 35.

The serialization unit 37 inserts the image data 32a output from the frame buffer 32 into a payload of the frame generated by the frame generation unit 36, converts the frame into serial data, and transmits the serial data to the controller 5 through the serial communication path 4.

<Frame Structure>

Figures 3A, 3B:
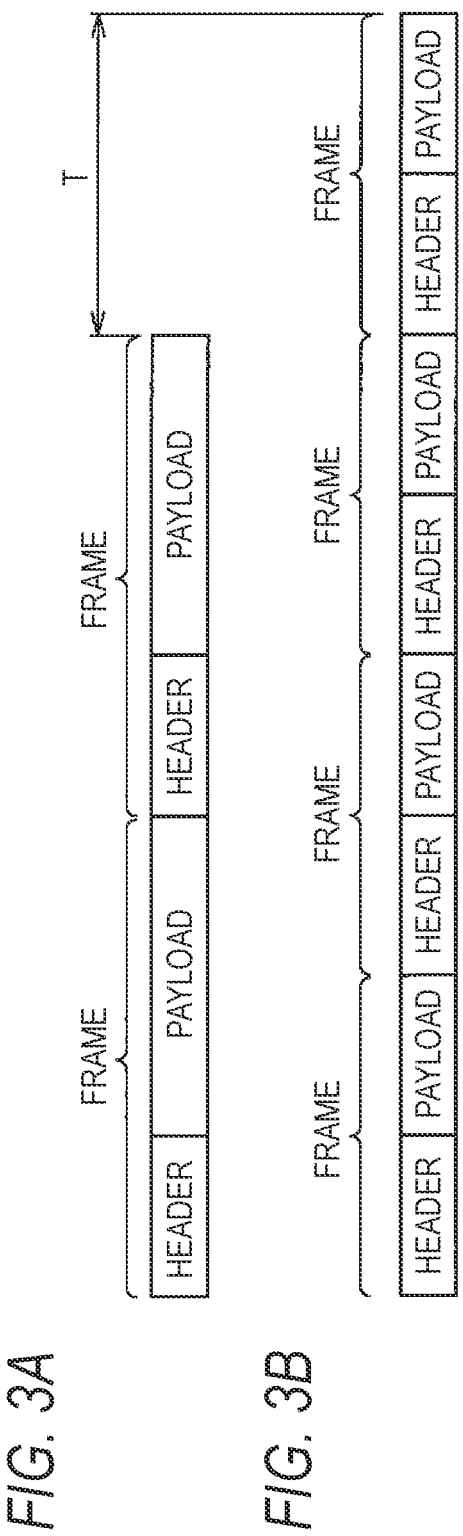
FIG. 3A is a packet diagram illustrating a frame structure when image data are transmitted in two frames.
FIG. 3B is a packet diagram illustrating a frame structure when the image data having the same data amount as that of FIG. 3A are transmitted in four frames.

FIG. 3A is a packet diagram illustrating a frame structure when the image data are transmitted in two frames. FIG. 3B is a packet diagram illustrating a frame structure when the image data having the same amount of data as that of FIG. 3A are transmitted in four frames. The frame including a header in which a transmission destination, a data amount, and the like are recorded and a payload that contains the image data. Here, the header is an instance of an overhead. If the transmission count increases from "two" illustrated in FIG. 3A to "four" illustrated in FIG. 3B, more time T is necessary to transmit the image data of the transmission count of "4" compared to the time for transmitting image data of the transmission count of "2" as much as the two headers. Therefore, the frame size selection unit 35 selects a relatively larger frame size with a higher priority to reduce the transmission count in the transmission of the remaining image data within a limited time.

<Instance of Method of Selecting Frame Size>

Figure 4A:
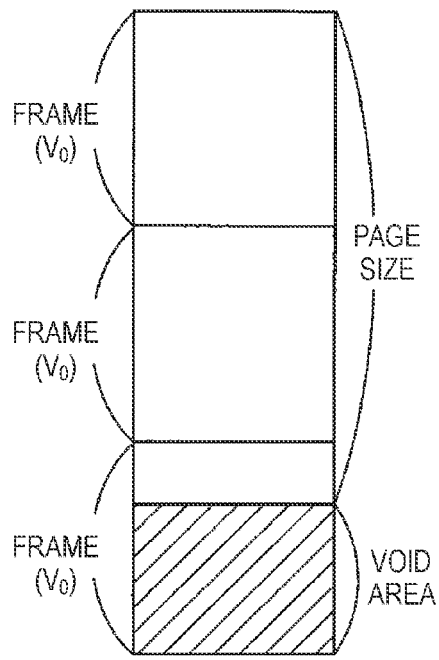
FIG. 4A is a diagram illustrating an exemplary method of selecting a frame size when the image data are transmitted at a frame size of $V_0$.
Figure 4B:
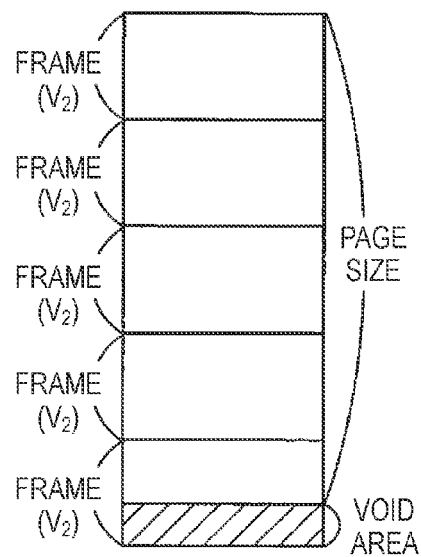
FIG. 4B is a diagram illustrating an exemplary method of selecting a frame size when the image data are transmitted at a frame size of $V_2$.

FIG. 4A is a diagram illustrating an exemplary method of selecting a frame size when the image data are transmitted at a frame size of $V_0$. FIG. 4B is a diagram illustrating an exemplary method of selecting a frame size when the image data are transmitted at a frame size of $V_2$. The frame size selection unit 35 selects the frame size of FIG. 4A which has a smaller number of segments as long as image data can be transmitted before a start of transmission of the next image data.

<Operation of Information Processing Apparatus>

Next, an instance of the operation of the information processing apparatus 1 will be described. A user sets plural originals 20 on the tray 21 of the image input unit 2 in a stack state and instructs reading of the originals 20 by manipulating the manipulation display unit 12. In the following description, it is assumed that the originals 20 have a formal size.

The automatic sheet feeding device 22 of the image input unit 2 starts automatic feeding of the originals 20. As the original 20 is detected, the original sensor of the original detection unit 23 transmits the original detection signal 23a to the original size determination unit 30 of the transmission control unit 3. The edge sensor of the original detection unit 23 transmits the page synchronization signal 23b to the original size determination unit 30 and an original edge detection unit 31 of the transmission control unit 3 from detection of the leading edge of the original 20 to detection of the trailing end of the original 20.

The original size determination unit 30 determines the size of the original 20 based on the original detection signal 23a and the page synchronization signal 23b from the original detection unit 23 and determines whether the original 20 has a formal or informal size. Then, the determination result 30a is output to the frame size selection unit 35.

Figure 5:
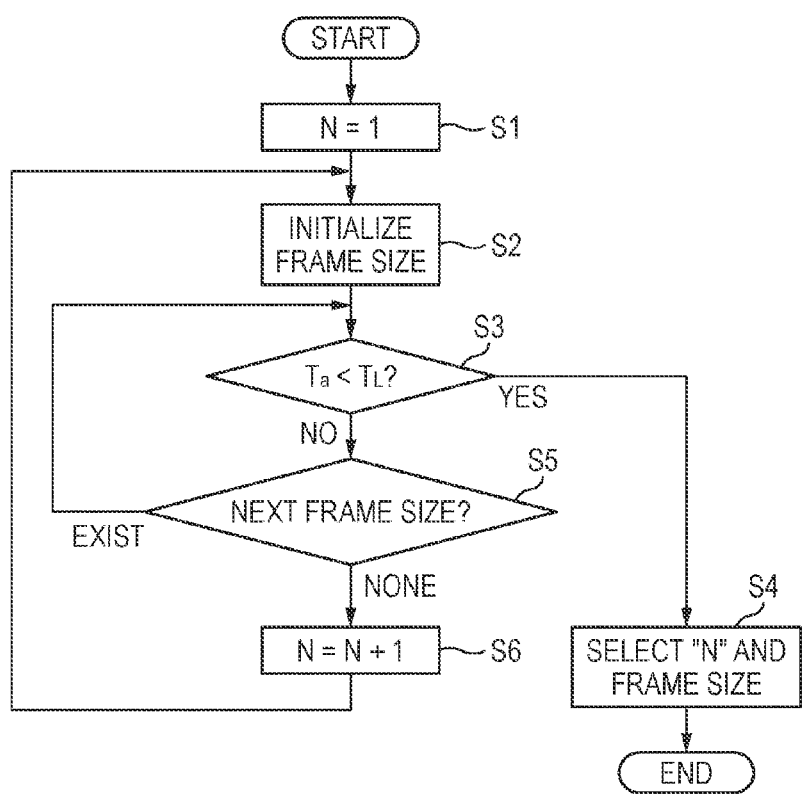
FIG. 5 is a flowchart illustrating an exemplary operation of a frame size selection unit when an original document has a formal size.

When it is determined that the original 20 has a formal size, the frame size selection unit 35 is operated as illustrated in the flowchart of FIG. 5.

FIG. 5 is a flowchart illustrating an exemplary operation of the frame size selection unit 35 when the original 20 has a formal size. Unless specified otherwise, it is assumed that this operation is performed by the frame size selection unit 35.

The frame size selection unit 35 sets the number of segments to "N=1" (which means no segment) in step S1 and initializes the frame size to a given value, for instance, "$V_0$" in step S2.

The frame size setting unit 35 obtains the data amount of the image data to be transmitted based on the determination result 30a from the original size determination unit 30 and computes a transmission time Ta (Ta=Tb×N, where "Tb" denotes a transmission time for transmitting a single frame) for transmitting the frames having the determined frame size (initialized to "$V_0$") and a time $T_L$ (limited time) from the start of transmission of the current image data to the start of transmission of the image data of the next original 20. Then, the frame size selection unit 35 determines whether or not a relationship of "Ta<$T_L$" is satisfied in step S3.

If it is determined that the relationship of "Ta<$T_L$" is satisfied (YES in step S3), the number of segments N (N=1) and the frame size $V_0$ are determined, and the frame size selection process is terminated in step S4.

In step S3, when it is determined that the relationship of "Ta<$T_L$" is not satisfied (NO in step S3), the frame size selection unit 35 determines whether or not there is the next smallest frame size $V_1$ in the size buffer 34 in step S5. When it is determined that there is the next smallest frame size $V_1$ in the size buffer 34 (YES in step S5), the comparison process is performed for the frame size $V_1$ similarly in step S3.

The steps S3 and S5 described above are repeated until the relationship of "Ta<$T_L$" is satisfied in step S3 (YES in step S3).

When there is no next smallest frame size in step S5 (NO in step S5), the number of segments is incremented (N=N+1) in step S6, and the frame size is initialized to "$V_0$" in step S2. Then, the steps S2, S3, S5, and S6 are repeated until an affirmative result is obtained in step S3.

When the frame size selection unit 35 determines the number of segments N and the frame size as described above, it is possible to reduce the number of segments and determine a frame size by which the image data can be transmitted before a start of the next transmission.

While exemplary embodiments of the present invention have been described hereinbefore, they are not intended to limit the scope of the invention. Various changes or medications may be possible without departing from the spirit and scope of the present invention. For instance, in step S5, a transmission time Tc, where "transmission time Tc=the data amount in the void area (refer to FIG. 4)+(header (overhead)×the number of segments)," and a time Td (PS negation time) elapsing from a finish of transmission of the image data corresponding to a page size to a start of transmission of the image data of the next original may be computed. Then, whether or not a relationship of "Tc<Td" is satisfied may be determined.

Any step of the flow described in the exemplary embodiments may be added, deleted, changed, or substituted without departing from the spirit and scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus that transmits image data input by sequentially reading originals, with limiting an allowable frame size, the apparatus comprising:
   a transmission control unit,
   wherein the transmission control unit includes:
   a storing unit that stores a plurality of frame sizes available for a serial interface;
   a frame size selection unit that selects one of the frame sizes stored in the storing unit based on the existing size of the original such that the image data are segmented and transmitted in a plurality of frames, and transmission of the image data is finished before a start of transmission of the image data of a next original;
   a frame generation unit that generates the frames having the one of the frames sizes selected by the frame size selection unit; and
   a serialization unit that converts the frames generated by the frame generation unit into serial data and transmits the serial data to the destination through the serial interface,
   wherein, in a case where an original has an existing size, the transmission control unit transmits the image data to a destination with frames having one of frame sizes selected based on the existing size of the original, such that transmission of a current image data is finished before a start of transmission of the image data of the next original.

2. The information processing apparatus according to claim 1,
   wherein the frame size selection unit preferentially selects a larger frame size out of a plurality of the frame sizes stored in the storing unit.

* * * * *